United States Patent
Xavier et al.

(10) Patent No.: US 11,689,824 B2
(45) Date of Patent: Jun. 27, 2023

(54) EVENT FILTERING METHOD FOR OPERATING AN EVENT-BASED IMAGE SENSOR

(71) Applicant: PROPHESEE, Paris (FR)

(72) Inventors: Lagorce Xavier, Saint-Maur-des-Fosses (FR); Daniel Matolin, Freital (DE); Denis Bourke, Nanterre (FR); Thomas Finateu, Veneux les Sablons (FR)

(73) Assignee: Prophesee, Paris (FR)

( * ) Notice: Subject to any disclaimer, the term of this patent is extended or adjusted under 35 U.S.C. 154(b) by 0 days.

(21) Appl. No.: 17/906,063

(22) PCT Filed: Mar. 10, 2021

(86) PCT No.: PCT/EP2021/056101
§ 371 (c)(1),
(2) Date: Sep. 9, 2022

(87) PCT Pub. No.: WO2021/180813
PCT Pub. Date: Sep. 16, 2021

(65) Prior Publication Data
US 2023/0125031 A1 Apr. 20, 2023

(30) Foreign Application Priority Data
Mar. 11, 2020 (EP) .................................. 20305251

(51) Int. Cl.
*H04N 25/47* (2023.01)
*H04N 25/707* (2023.01)
(Continued)

(52) U.S. Cl.
CPC ........... *H04N 25/47* (2023.01); *H04N 25/707* (2023.01); *H04N 25/771* (2023.01); *H04N 25/7795* (2023.01)

(58) Field of Classification Search
CPC .... H04N 25/47; H04N 25/707; H04N 25/771; H04N 25/7795
See application file for complete search history.

(56) References Cited

U.S. PATENT DOCUMENTS

| 8,780,240 B2 * | 7/2014 | Posch | H04N 25/00 348/297 |
| 9,213,902 B2 * | 12/2015 | Benosman | G06V 20/52 |
| 2022/0400213 A1 * | 12/2022 | Endo | H04N 23/60 |

FOREIGN PATENT DOCUMENTS

EP 3518529 A1 * 7/2019 ............. H04N 5/341

* cited by examiner

*Primary Examiner* — Nhan T Tran
(74) *Attorney, Agent, or Firm* — Finnegan, Henderson, Farabow, Garrett & Dunner, LLP

(57) ABSTRACT

Embodiments of the present disclosure include an event-based image sensor and an event filtering method for use with an event-based image sensor. The event-based image sensor comprises a plurality of pixel circuits forming a pixel array, each pixel circuit comprising a photoreceptor circuit configured to generate a photoreceptor signal derived from a photocurrent generated by a light impinging on a light-sensitive element of the photoreceptor circuit, and a detector configured to detect a change in the photoreceptor signal and to generate an event in response to the detected change in the photoreceptor signal. The event-based image sensor further includes a processing chain and an event filter that is configured to receive the generated event and to accept the received event based on a plurality of conditions. The plurality of conditions include a condition that the received event is part of a previously unaccepted event trail, the event trail comprising a plurality of successive events having a same polarity and separated by time intervals each shorter than a time threshold.

21 Claims, 8 Drawing Sheets

(51) Int. Cl.
*H04N 25/771* (2023.01)
*H04N 25/76* (2023.01)

EVENT FILTERING METHOD FOR OPERATING AN EVENT-BASED IMAGE SENSOR

CROSS-REFERENCE TO RELATED APPLICATION(S)

This application is a U.S. National Stage application of International Application No. PCT/EP2021/056101, filed Mar. 10, 2021, which claims priority to EP Application No. 20305251.9, filed Mar. 11, 2020. Each of the above-referenced applications is expressly incorporated herein by reference in its entirety.

CONTEXT AND BACKGROUND OF THE INVENTION

The invention relates to an event-based image sensor and an operating method thereof.

The invention relates to a pixel circuit for an image sensor for temporally differentiating photo-sensing systems (i.e. temporal contrast sensors), especially for low-consumption reduced-area analogue integrated circuits for photo-sensing applications.

In conventional video cameras, the apparatus records photogram after photogram. In temporal contrast sensors, there are no photograms. Like in video cameras, the integrated circuit contains a photo sensor matrix. However, in conventional video cameras, each photo sensor is sampled at a fixed frequency, whereas in temporal contrast sensors, pixels are not sampled: each pixel calculates the intensity change of the light it senses, optionally performs some processing on this intensity change, and when the calculated quantity exceeds a defined level or threshold, the pixel generates an "event" and transmits information related to this event. This type of sensor is therefore referred to as an event-based image sensor.

The transmitted information usually consists of the x,y-coordinate of the pixel within the two-dimensional photo sensor matrix, together with a polarity to indicate whether the light intensity has increased or decreased. Thus, the generated data are not constituted by a succession of frames containing the image information of all pixels, but a stream of events reflecting change of intensity of individual pixels.

This method leads to a substantial reduction of generated data through complete suppression of the temporal redundancy in the picture information that is typical for conventional image sensors, though with the data containing the same, or even higher, information content. The picture element for an event-based image sensor that implements the aforementioned method as well as the required asynchronous data readout mechanism can be realized with electronic circuits. An event-based image sensor with a multiplicity of such picture elements is typically realized and fabricated as an integrated system-on-chip e.g. in CMOS technology.

An electronic circuit, often called a transient detector, is used for detecting changes in lighting intensity received by the individual, autonomously operating pixels, for example in the case of an optical transient sensor, or dynamic vision sensor (DVS), as described in U.S. Pat. No. 7,728,269. However, such a transient detector circuit requires large switched-capacitors, and mismatch between voltage comparators used for assessing the changes may be problematic.

U.S. Pat. No. 8,780,240 discloses combining transient detector circuits, i.e. light exposure intensity changes detector circuits, and conditional exposure measurement circuits. A transient detector circuit individually and asynchronously initiates the measurement of a new exposure measure only if—and immediately after—a brightness change of a certain magnitude has been detected in the field-of-view of a pixel. Such a pixel does not rely on external timing signals and independently requests access to an (asynchronous and arbitrated) output channel only when it has a new grayscale value to communicate. Consequently, a pixel that is not stimulated visually does not produce output. In addition, the asynchronous operation avoids the time quantization of frame-based acquisition and scanning readout.

However, even the reduction in temporal redundancy achieved with such an event-based image sensor might not be enough. To improve sensitivity to contrast changes, it is sought to decrease the thresholds of change detection. To improve image resolution, it is also sought to increase the number of pixels. This leads to a high number of events being generated, resulting in so-called burst of events when the sensor images a scene with moving edges (caused by moving objects or displacement of the sensor) having strong contrasts.

Bursts of events can be used to detect frequency patterns in the light profile. Patent application EP3518529 discloses a method for detecting flickering effects in an imaged scene, through a measurement method aiming at detecting frequency patterns. To this end, the flow of events is monitored to detect bursts of events (burst extraction). The successive bursts are then analyzed to detect frequency patterns. The method can be used to detect an object in a scene by simply recognizing the frequency pattern of the light source, such as a nominal frequency and/or duty cycle of some light source, such as traffic light, braking lights and other light sources. The method can also be used to transmit some information, such as an ID, encoded in basic characteristics of the light modulation, such as frequency and/or duty cycle. In this process, the flow of events in the processing chain is not affected, i.e. all the events originating from a change detector continue being processed in the processing chain.

However, bandwidth restrictions and limited processing capacities during bursts of events may lead to processing latency and/or loss of information. Also, as the sensitivity is increased, noise will cause unwanted events to be generated.

It has been proposed to filter the events generated by an asynchronous event-based image sensor. Previous algorithms rely on the assumption that when a pixel is triggered neighboring pixels are also activated and large intensity changes generate multiple events at a single pixel. These assumptions motivate the use of spatial-temporal density as a way to isolate valid events from noise, but this approach fails when motion is slow (i.e. sparse valid events are removed as noise) and when noise is high (i.e. dense noise mislabeled as real events).

In the article "*Inceptive Event Time-Surfaces for Object Classification using Neuromorphic Cameras*", R. Wes Baldwin, M. Almatrafi, J. R. Kaufman, V. Asari and K. Hirakawa, published on Jul. 27, 2019, at the 16th International Conference on Image Analysis and Recognition, the authors propose a method to filter the raw events to keep a clear representation of the object boundaries that define the shape of objects of interest. Their method is based on the fact that a single log-intensity change often triggers multiple events in temporal sequence. Let's take the events generated from a single pixel in front of a moving imaged scene. A first event indicates an arrival of an edge in the imaged scene. The subsequent events, close in time to the first event, correspond to the magnitude of the intensity change. The first event describes the shape of the moving object and may be referred to as an "inceptive event" whereas the subsequent events correspond to the magnitude of the change caused by the moving edge, and may be referred to as "scaling events".

The proposed filtering consists in keeping an event only if:
1) the time interval between an event $t_i$ and the previous event $t_{i-1}$ is larger than a first interval time $\tau^-$, and
2) the time interval between the next event $t_{i+1}$ and the current event $t_i$ is smaller than a second time threshold $\tau^+$.

In accordance with this filtering, only the first event of a burst of events is kept (condition 1), and isolated events are discarded (condition 2) to eliminate noise-induced events.

If this method effectively filters bursts of events and reduce the noise, it however suffers from two major drawbacks:
- a change of polarity in the events of a burst of events will not be taken into account since only the first event of a burst of events is kept, regardless of the polarities of the subsequent events,
- before deciding to keep the current event the method needs to wait for the next event $t_{i+1}$, which requires storage capabilities to keep events before accepting them, and adds a latency corresponding to the second duration threshold $\tau^+$.

This method could lead to erroneous results when burst of events are close to each other, and when they are mixed with noise. Also, noise-induced events are not completely eliminated. The method may also lead to the accepted events not being kept in their temporal order, which could be detrimental and requiring additional processing to reorder them.

Accordingly, there is a need for an event-based signal processing filtering method that can improve signal-to-noise ratio of an event-based signal and reduces bandwidth and processing requirements, without introducing latency.

SUMMARY OF THE INVENTION

The invention relates to an event filtering method for operating an event-based image sensor comprising a plurality of pixel circuits forming a pixel array, wherein each pixel circuit comprises:
- a photoreceptor circuit configured for delivering a photoreceptor signal derived from a photocurrent generated by a light impinging on a light-sensitive element of the photoreceptor,
- a change detector configured for detecting a change in the photoreceptor signal, and emitting an event each time a change is detected, an event being characterized at least by a polarity reflecting a direction of the change, the event-based image sensor comprising a processing chain which includes a pixel circuit, an arbiter, a sensor driving circuit, and a host, and events generated by the pixel circuit are sent to the arbiter, then to the sensor driving circuit, and finally to the host, characterized in that the event-based image sensor comprises an event filter arranged within a component of the event-based image sensor or between two components of the event-based image sensor, the components being chosen among the pixel circuit, the arbiter, the sensor driving circuit, or the host,
the event filter arranged in the processing chain receives a series of events originating from a change detector, and for each received event, the event filter either accepts or rejects the received event, an accepted event being transmitted for further processing by the processing chain, a rejected event being discarded without further processing by the processing chain, the event filter accepting the received event only if a first condition a) and a second condition b) are met:
a) the received event has a same polarity as a polarity of a at least a last received event and,
b) the received event and the last received event are separated by a time interval shorter than a time threshold.

The invention allows improving signal-to-noise ratio of an event-based signal and reduces bandwidth and processing requirements, without introducing latency, by removing spurious isolated events due to noise, keeping only events that are generated by strong spatio-temporal contrasts, and removing events from bursts of events.

Other preferred, although non-limitative, aspects of the invention are as follows, isolated or in a technically feasible combination:
- the event filter is associated with at least one polarity memory element whose state depends on the polarity of the last received event and which is used to determine whether condition a) is met, the event filtering method comprising changing the state of the polarity memory element when the polarity of the received event is different from the polarity of the last received event;
- the event filter comprises a timer that is reset each time an event is received, said timer being configured to output a timer signal after a duration corresponding to the time threshold, condition b) being met in the absence of the timer signal;
- a modified first condition a) for the event filter to accept the received event is: a') the received event has a same polarity as the polarity of the last M−1 received events, with M>2;
- an additional second condition b') for the event filter to accept the received is: b') the received events and the last M−1 received events are successively separated by time intervals each shorter than the time threshold;
- the event filter comprises a counter which is incremented each time an event is received and is reset with a timer signal sent by a timer, said timer being reset each time an event is received, said timer being configured to output the timer signal after a duration corresponding to the time threshold, the additional second condition b') met only if the counter is at least at M−1;
- the counter is also reset each time the received event has not the same polarity as the polarity of the last received event;
- the event filter only accepts the received event if a further third condition is met: c) the received event is part of a trail of events in which no previously received event was accepted, a trail of events consisting in a series of successive events of same polarity separated by time intervals each shorter than the time threshold;
- the event filter is associated with a trail memory element whose state indicates whether a received event has been accepted since the last reset, the trail memory element being reset in a first state at least each time the received event has a polarity different from the polarity of the last received event, and the trail memory element being set in a second state each time an event is accepted;
- the trail memory element is also reset in the first state each time the received event and the last received event are separated by a time interval longer than the time threshold
- a counter is incremented each time an event is received, and is reset with the timer signal sent by the timer and each time a polarity change is detected, the received event being accepted only if the counter is at M−1, with M≥2.

The invention also relates to an event-based image sensor comprising a plurality of pixel circuits forming a pixel array, wherein each pixel circuit comprises:
- a photoreceptor circuit configured for delivering a photoreceptor signal derived from a photocurrent generated by a light impinging on a light-sensitive element of the photoreceptor,
- a change detector configured for detecting a change in the photoreceptor signal, and emitting an event each time a change is detected, an event being characterized at least by a polarity reflecting a direction of the change, wherein the event-based image sensor comprises a processing chain which includes a pixel circuit, an arbiter, a sensor driving circuit, and a host, and events generated by the pixel circuit are sent to the arbiter, then to the sensor driving circuit, and finally to the host, wherein the event-based image sensor comprises an event filter arranged within a component of the event-based image sensor or between two components of the event-based image sensor, the components being chosen among the pixel circuit, an arbiter, a sensor driving circuit, or a host, the event filter being configured to receive a series of events originating from a change detector, and for each received event, to either accept or reject the received event in accordance with the event filtering method of the invention, an accepted event being transmitted for further processing by the processing chain, a rejected event being discarded without further processing by the processing chain, the event filter accepting the received event only if a first condition a) and a second condition b) are met:

a) the received event has a same polarity as a polarity of at least a last received event and,
b) the received event and the last received event are separated by a time interval shorter than a time threshold.

Preferably, the event filter is arranged within a component of the event-based image sensor or between two components of the event-based image sensor, the components being chosen among the pixel circuit, an arbiter, a sensor driving circuit, or a host.

BRIEF DESCRIPTION OF THE DRAWINGS

Other aspects, objects and advantages of the present invention will become better apparent upon reading the following detailed description of preferred embodiments thereof, given as non-limiting examples, and made with reference to the appended drawings wherein.

DETAILED DESCRIPTION OF THE INVENTION

Figure 1:
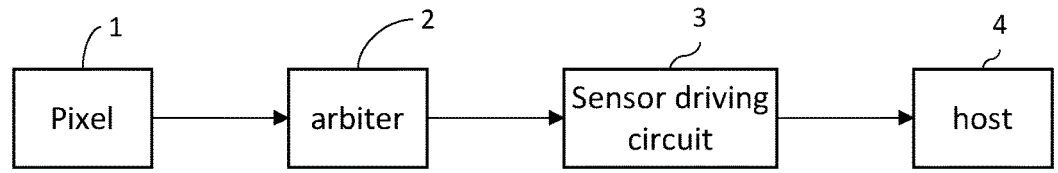
FIG. 1 shows a schematic diagram of components of an event-based image sensor, according to a possible embodiment of the invention.
Figure 2:
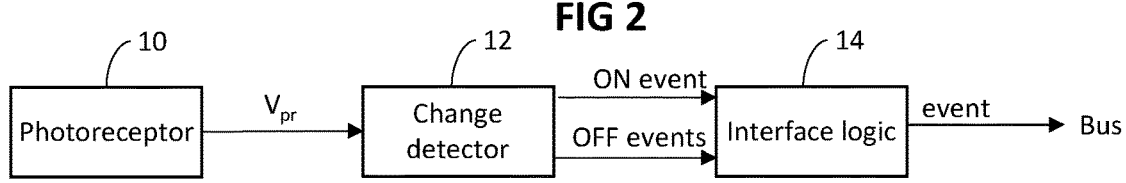
FIG. 2 shows a schematic diagram of components of a pixel circuit of an event-based image sensor, according to a possible embodiment of the invention.

In reference to FIG. 1, an event-based image sensor usually comprises several components in a processing chain: a plurality of pixel circuits 1, a bus arbiter 2, a sensor driving circuit 3 and a host 4. As illustrated on FIG. 2, each pixel circuit 1 comprises a photoreceptor circuit 10 configured for delivering a photoreceptor signal derived from the photocurrent generated by light impinging on a light-sensitive element of the photoreceptor 10, and a change detector 12 configured for detecting a change in the photoreceptor signal $V_{pr}$ derived from the photocurrent. A band-pass filter can be provided between the photoreceptor circuit 10 and the change detector 12 to filter the photoreceptor signal $V_{pr}$.

The light-sensitive element of the photoreceptor 10 is typically a photodiode and converts incident light into a photocurrent, determined by the light exposure of the light-sensitive element. The photoreceptor signal $V_{pr}$ is usually in a logarithmic relationship with the photocurrent. Typically, the photoreceptor signal $V_{pr}$ can be approximated as $$V_{pr} = k_1 \ln(I_{pr}) + k_2$$

wherein $I_{pr}$ is the intensity of the photocurrent, $k_1$ and $k_2$ are constant factors. The instantaneous voltage value of the photoreceptor signal $V_{pr}$ relates logarithmically to the instantaneous intensity of the photocurrent, and consequently a measurement of the photoreceptor signal $V_{pr}$ allows to derive the light exposure level of the light-sensitive element of the photoreceptor circuit 10.

The change detector 12 is configured to detect a change in the photoreceptor signal $V_{pr}$. Typically, a change is detected when the photoreceptor signal increases or decreases by a quantity equal to a threshold, corresponding to an increase of the light impinging on a light-sensitive element of the photoreceptor or to a decrease of the light impinging on a light-sensitive element of the photoreceptor. The change detector 12 continuously monitors the photoreceptor signal $V_{pr}$ for changes and emits a detection signal each time a change is detected. A detection signal identifies a fractional increase or decrease in the photoreceptor signal $V_{pr}$ that exceeds adjustable voltage thresholds. An event corresponds to such a detection signal. An event is characterized at least by a polarity (ON or OFF) reflecting a direction of the change in the photoreceptor signal $V_{pr}$. The direction of the change can be an increase in the photoreceptor signal (the signal goes up) or a decrease in the photoreceptor signal (the signal goes down). More precisely, the change detector 12 generates an ON event when the photoreceptor signal $V_{pr}$ increases, i.e. exceeds by a threshold a previous value, and the change detector 12 generates an OFF event when the photoreceptor signal $V_{pr}$ decreases, i.e. comes below a threshold with respect to a previous value. A comparator is usually used to compare the instantaneous value of the photoreceptor signal $V_{pr}$ with a previous value used as a reference. An event is not only characterized by a polarity, but is also characterized by a pixel address constituted by the row and column coordinates (x, y) of the pixel circuit 10 in which the event is generated. An event is also generated or sent at a particular time, and may also be characterized by an event time. A change detector 12 that can be used for detecting changes in lighting intensity received by the pixels, for example in the case of dynamic vision sensor (DVS), is described in U.S. Pat. Nos. 7,728,269 and 8,780, 240.

The pixel circuit 1 also comprises an interface logic 14 that receives the ON and OFF events from the change detector 12. The function of the interface logic 14 is to cooperate with other components downstream to ensure that events sent to the bus will be handled appropriately, and the interface logic 14 thus usually works with the arbiter 2. For example, the interface logic 14 may send a row request reqX and a column request reqY to the arbiter 2 that acknowledges that the photoarray is ready to process a new received event by sending back acknowledgment signal ACK to the interface logic 14. The arbiter 2 may comprise a row arbiter and a column arbiter. Events generated by the pixel circuit 1 are sent to the arbiter 2, then to the sensor driving circuit 3, and finally to the host 4. The host 4 is for example a computer comprising a processing unit, and is configured to render an image from the received events.

Figure 3:
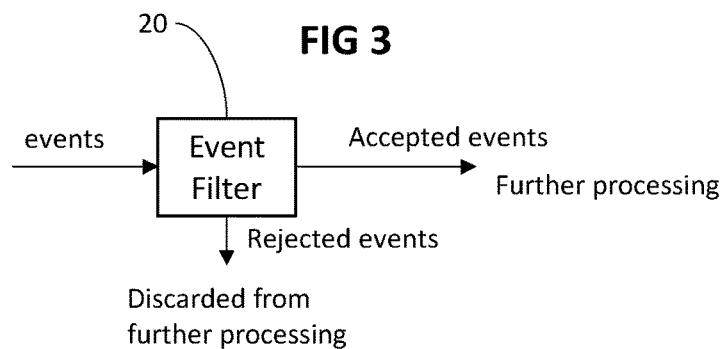
FIG. 3 is a schematic diagram showing the functions of an event filter in accordance to a possible embodiment of the invention.

The event-based image sensor comprises an event filter configured to receive events originating from a change detector 12 of a pixel circuit 1, and for each received event, either to accept or to reject the received event, as illustrated on FIG. 3. The accepted events are transmitted for further processing downstream of the processing chain, whereas the rejected events are discarded without further processing by the processing chain. The event filter 20 actually filters the events travelling the processing chain: the accepted events can pass the event filter 20 whereas the rejected events cannot. The event filter 20 therefore output only accepted events.

The event filter 20 accepts a received event only if two conditions are met:

a) the received event has a same polarity as a polarity of at least a last received event and, b) the received event and the last received event are separated by a time interval shorter than a time threshold.

The time interval between events can correspond to the time interval between their respective reception by the event filter 20, or timestamps can be associated with each event, and the time interval then corresponds to the difference between the timestamps. The time threshold is inferior to 100 ms, preferably inferior to 50 ms, and preferably inferior to 10 ms, and more preferably is inferior to 1 ms.

Figure 4:
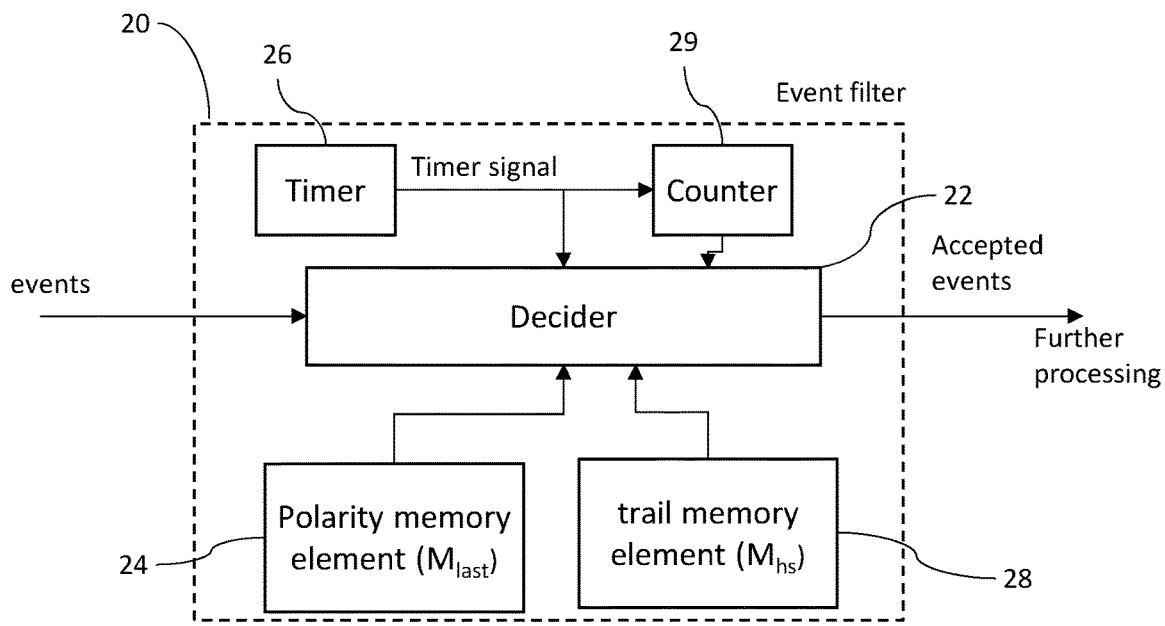
FIG. 4 is a schematic diagram detailing a possible structure of an event filter in accordance to a possible embodiment of the invention.

FIG. 4 shows an example of a structure of an event filter 20 to illustrate the description. The decision whether to accept or reject the received event is made by a decider 22, which can be any device able to implement Boolean functions. For example, the decider can be a set of logic gates such as AND gates, NAND, OR or NOR gates, since only simple logic operations are to be performed. The decider 22 may also be a more complex device, such as an integrated circuit, and may also be implemented as a software.

In order to perform the filtering, the event filter 20 uses two pieces of information: the polarity of at least one immediately preceding last received event and a time information related to said last event. One of the ways to provide information about the polarity of the last received event is to associate a polarity memory element 24 with the event filter 20. As illustrated, the polarity memory element 24 is preferably part of the event filter 20. The polarity memory element 24 has a state $M_{last}$ that depends on the polarity of the immediately preceding last received event. As a non-limitative example, in the rest of the description, the state $M_{last}$ is 0 when the last received event was OFF, and the state $M_{last}$ is 1 when the last received event was ON. The polarity memory element 24 may be a latch such as a simple set-reset latch, since only one bit of information is to be stored, i.e. either 1 or 0. An ON event or an OFF event usually consists in a pulse, and the state of the polarity memory element 24 is preferably changed at the falling edge of the pulse of the ON event or OFF event. For example, in the example of a latch, the latch is set at the pulse falling edge of an ON event, and is reset at the pulse falling edge of an OFF event.

The event filter 20 can be arranged in different locations in the processing chain of the event-based image sensor. In particular, the event filter 20 can be arranged within a component of the event-based image sensor chosen among the pixel circuit 1, the arbiter 2, the sensor driving circuit 3, or the host 4. The event filter 20 can also be arranged:

between the pixel circuit 1 and an arbiter 2, or between the arbiter 2 and a sensor driving circuit 3, or between the sensor driving circuit 3 and a host 4.

Where the event filter 20 is arranged within a first component or between said first component and a second component of the processing chain, the event filter 20 prevents the rejected events from reaching the second component: only the accepted events can reach the second component. For example, where the event filter 20 is arranged within the pixel circuit 1, it causes the pixel circuit 1 to send only the accepted events to the remaining of the processing chain, and in the first place to the arbiter 2. The rejected events are not sent to the arbiter 2. Where the event filter 20 is arranged between the pixel circuit 1 and the arbiter 2, the pixel circuit 1 emits all the raw events, but the event filter 20 filters the events so that only the accepted events are sent to the to the remaining of the processing chain, and in the first place to the arbiter 2. The rejected events are not sent to the arbiter 2.

Figure 5:
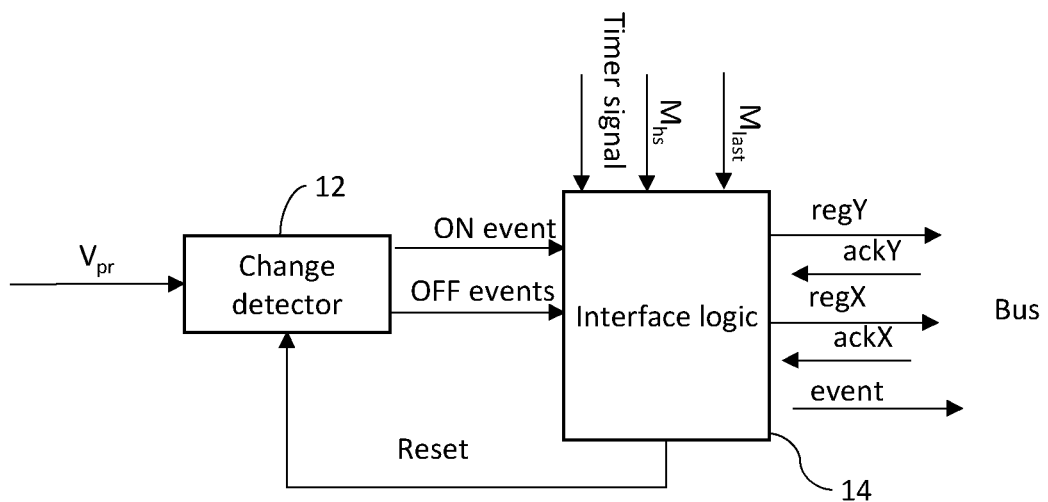
FIG. 5 is a schematic diagram showing how an interface logic of a pixel circuit can act as an event filter in accordance to a possible embodiment of the invention.

Whatever the arrangement, the event filter 20 reducing bandwidth requirements due to the rejection of some events, and in particular of noise events. In a particularly advantageous embodiment, the event filter 20 is part of the pixel circuit 1. Integrating the event filter 20 within the pixel circuit 1 allows filtering unwanted data at the earliest possible point, and does not consume memory or signal-bandwidth in the digital part of the sensor. FIG. 5 shows an example of such an in-pixel implementation. The decider 22 is here the interface logic 14, which receives the ON events and OFF events from the change detector 12, a timer signal sent by a timer, a state $M_{last}$ that depends on the polarity of the immediately preceding last received event, a state $M_{hs}$ indicating whether a received event has been accepted in a trail of events. The interface logic 14 can also control a reset of the change detector 12. The interface logic 14 communicates through a bus with a bus arbiter 2 to send the request signals reqX, reqY, to receive the acknowledgment signals ACK, and to send the events.

Figure 6:
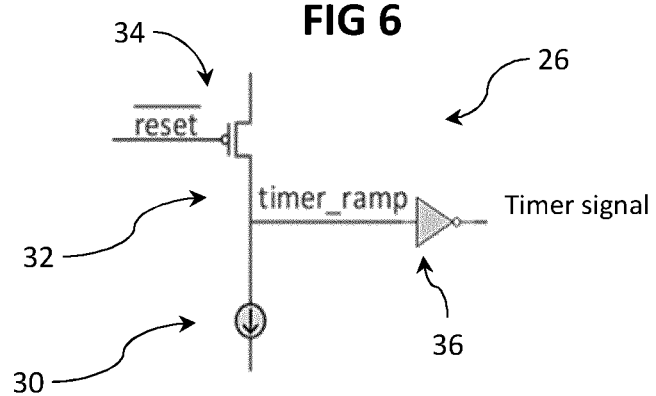
FIG. 6 is a schematic diagram of a timer that can be used in an event filter in accordance to a possible embodiment of the invention.

The event filter 20 is associated with a timer 26 that provides the decider 22 with the time information related to the previously received event. As illustrated, the timer 26 is preferably part of the event filter 20. The timer 26 is reset each time an event is received. FIG. 6 shows an example of a suitable timer 26, comprising a current source 30 which charges down a voltage node 32, defining a voltage timer ramp signal decreasing over time. To the voltage node 32 is connected a drain of a P-MOS transistor 34, whose gate is controlled by a timer reset signal. The timer reset signal activates the transistor 34 to make it conducting each time an event is received, thus resetting the voltage node 32. To the voltage node 32 is also connected a buffer or an inverter 36 that converts the analog ramping signal into a binary timer signal. When the voltage node 32 charges down and passes the threshold voltage of the inverter 36, the timer signal changes to indicate that the preset time has lapsed since the previous event was received. By adjusting the current source 30, the preset time can be adjusted.

Figure 7:
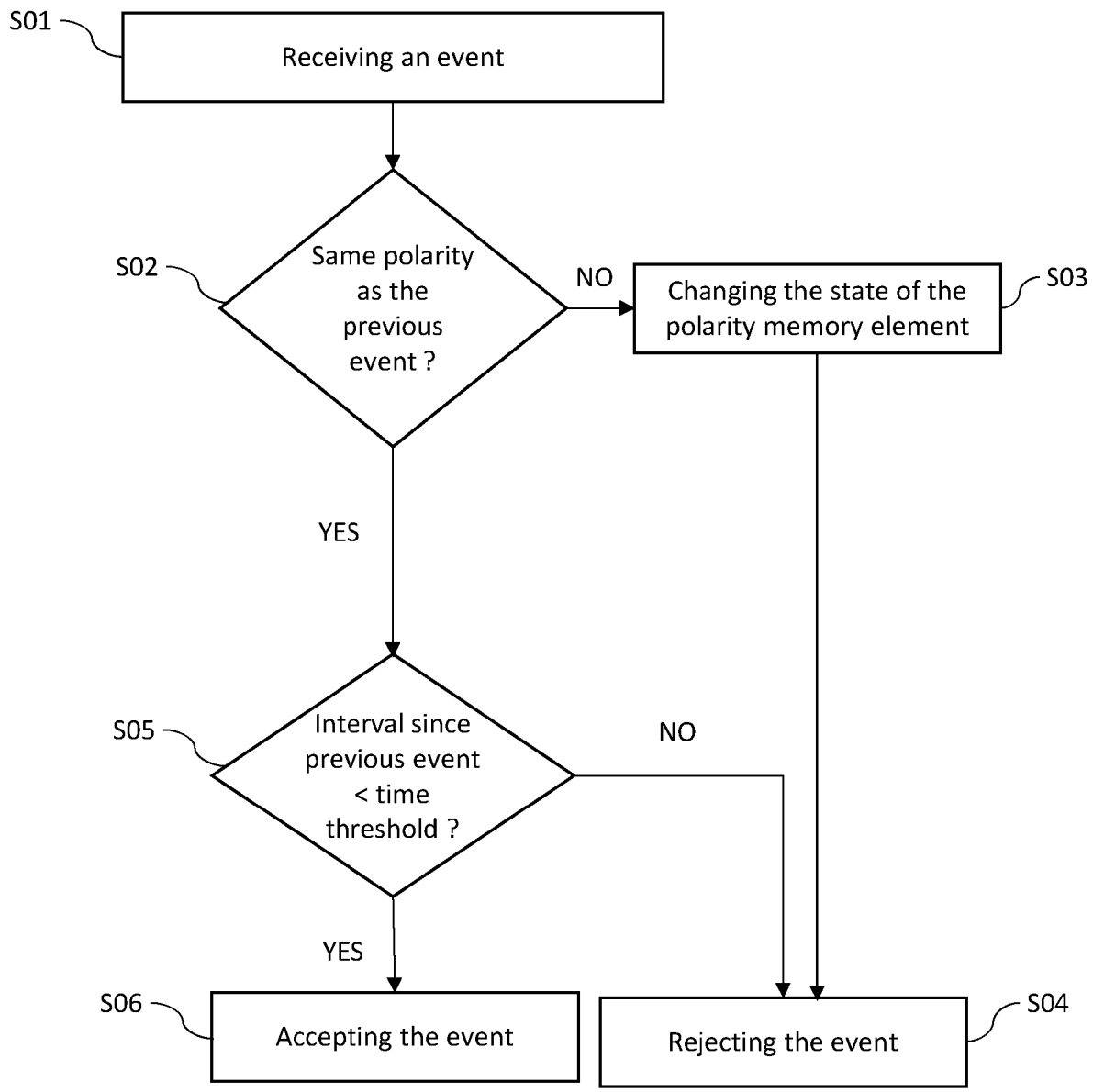
FIG. 7 is a flowchart showing steps of event filtering performed by an event filter in accordance to a possible embodiment of the invention.

The filtering performed by the event filter 20 is illustrated by FIG. 7. In a first step S01, an event is received by the event filter 20. In a second step S02, the polarity of the received event is checked to verify whether the received event has a same polarity as the polarity of the last received event. If not, the event is rejected (step S04). To compare the polarities, the event filter 20 may use the state stored in the polarity memory element 24. The step S02 thus comes down to comparing the polarity of the received event with the state stored in the polarity memory element 24. The state of the polarity memory element 24 is changed (Step S03) at least each time it is determined that the received event has a different polarity than the polarity of the last received event.

For example, when the state $M_{last}$ is 0 (last event was an OFF event):
if the received event has an OFF polarity, the state $M_{last}$ is kept unchanged at 0,
if the received event has an ON polarity, the state $M_{last}$ is changed to 1 after the comparison.

Conversely, when the state $M_{last}$ is 1 (last event was an ON event):
if the received event has an ON polarity, the state $M_{last}$ is kept unchanged at 1,
if the received event has an OFF polarity, the state $M_{last}$ is changed to 0 after the comparison.

If the received event has the same polarity as the polarity of the last received event, the event filter 20 verifies whether the time interval between the received event and the last received event is shorter than the time threshold (step S05). If yes, the event is accepted (step S06), and the accepted event is transmitted for further processing. If not, the event is refused (step S06), and the refused event is discarded.

Figure 8:
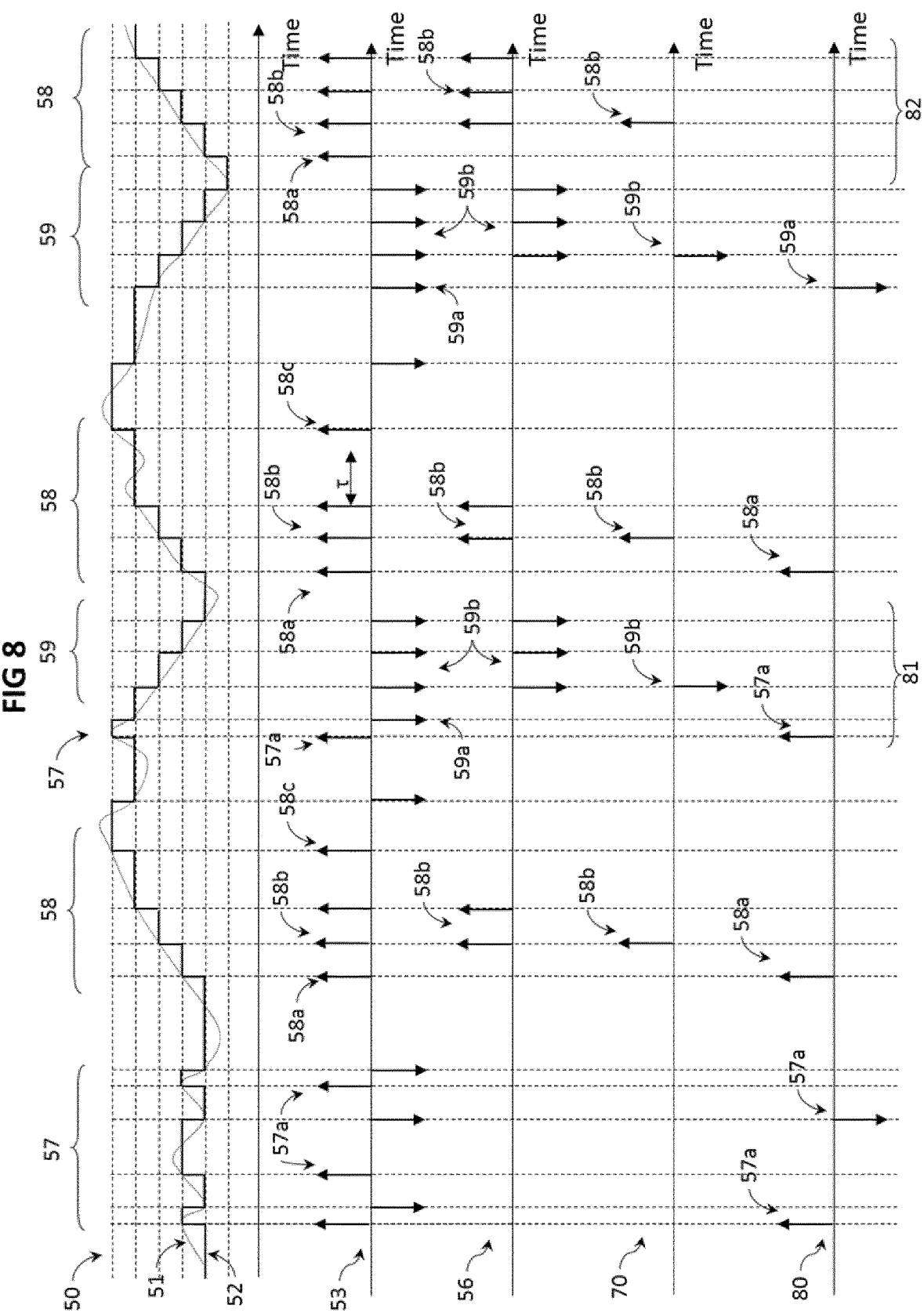
FIG. 8 shows graphs illustrating different event filtering applied to an example of evolution over time of a photoreceptor signal.

The event filter 20 thus only keeps events for which there was another event in the past at the same pixel location and with the same polarity with a time difference between those two events lower than an adjustable time threshold. To illustrate the effect of such a filtering, the upper graph 50 of FIG. 8 shows, in an idealized and simplified way, an example of an evolution over time of a photoreceptor signal $V_{pr}$ (doted line 51), whose incremental variation (stepped curve 52) of the detection threshold is also shown for more clarity. Each time the photoreceptor signal $V_{pr}$ crosses a detection threshold, an ON event or OFF event is sent by the change detector 12, as shown with arrows in the second graph 53. The up arrows indicate the generations of ON events and the down arrows indicate the generations of OFF events.

The third graph 56 of FIG. 8 shows the events that are accepted by the event filter 20 with a filtering based on the two acceptation conditions: a) the received event has a same polarity as a polarity of a at least a last received event and, b) the received event and the last received event are separated by a time interval shorter than a time threshold.

It is clear that some events are not accepted. For example, parts 57 of the photoreceptor signal $V_{pr}$ show isolated variations causing isolated events that can be interpreted as noise. Condition b) requiring that the received event and the last received event must be separated by a time interval shorter than a time threshold is not met for isolated events, and such noise events are therefore efficiently discarded. Noise can also be characterized by small amplitude and quick polarity variations, resulting in alternating noise events 57a with opposed polarities. As a result, even though the time intervals between noise events 57a may be inferior to the time threshold (condition b is met), the noise events 57a are successfully rejected by the event filter 20 because condition a is not met (polarity changes).

Contrary to noise-induced events, events generated by an actual edge are not isolated, but generally closely follow each other, with the same polarity, forming a burst of events. Those events are not considered as noise and not all of them are rejected. During a strong increase 58 of the photoreceptor signal $V_{pr}$, corresponding to an actual edge, the first event 58a of a resulting burst of ON events is rejected (condition a) not met), while the subsequent events 58b are kept. The filtered events can still render the strong contrast causing this strong increase 58 of the photoreceptor signal $V_{pr}$. However, later events 58c at the end of the strong increase 58 are rejected, because they come too late with respect to the previous event 58b. The number of events in a burst of events is therefore reduced, in particular for the later events. Similarly, during a strong decrease 59 of the photoreceptor signal $V_{pr}$, the first event 59a of a resulting burst of events is rejected, while the subsequent events 59b are kept. The filtering by the event filter 20 therefore eliminates the noise, and reduces the number of events in a burst of events, alleviating the bandwidth requirement.

The filtering by the event filter 20 produces accepted events only when the change of the photoreceptor signal $V_{pr}$ is strong enough, and therefore selects only strong contrasts in the imaged scene. The event filter 20 takes a filtering decision without looking for future events. With the filtering, the first event 58a, 59a of a burst of events is lost, increasing the sensor latency, and two events are needed to generate an accepted event reflecting the photoreceptor's response. This could be interpreted as a lower contrast sensitivity in addition to a greater latency. It is however possible to mitigate this effect by increasing contrast sensitivity (i.e. lowering the voltage threshold for detecting change), without fearing for increased noise since the filtering efficiently removes the noise events 57a. With an increased sensitivity, noise affecting the pixel circuit should most often generate single, isolated, events while actual edges will generate more than one event, and generally a burst of events. Noise-induced events are thus effectively filtered out, while edge-induced events are not. It is therefore possible to increase data quality. Increasing the contrast sensitivity also leads to the subsequent event 58b of a burst of events being closer in time to the first event 58a, thereby reducing the latency.

Figure 9:
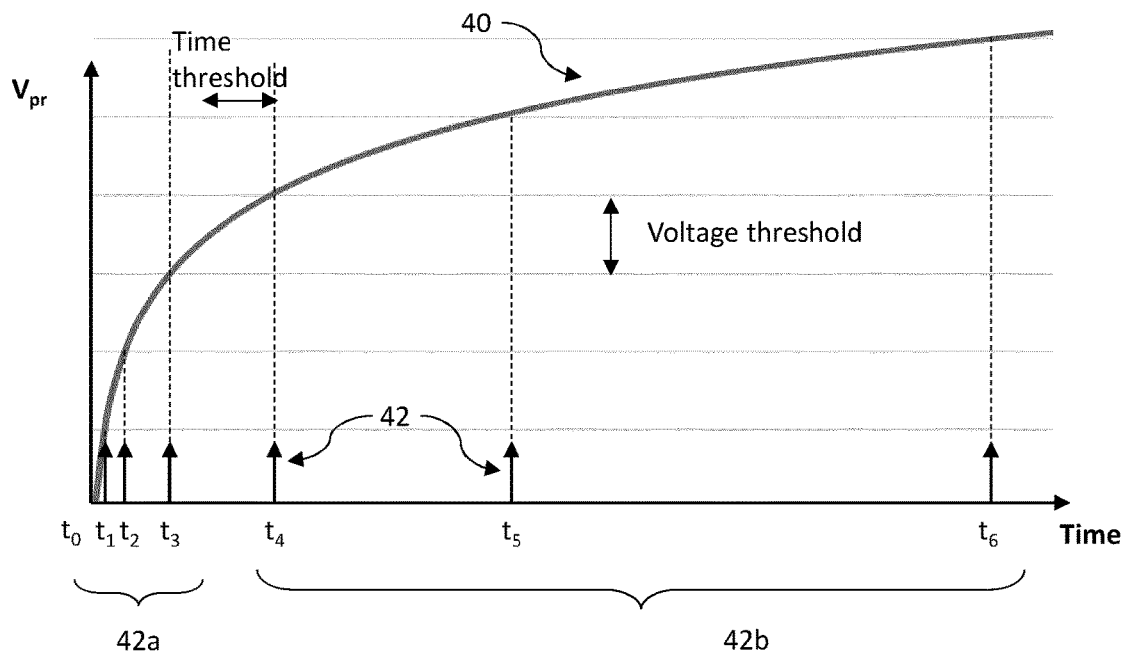
FIG. 9 is a schematic diagram of a photoreceptor signal and the change detections in response to an illumination step.

The rejection of isolated events, i.e. of received events with too great a time interval with the immediately preceding last received event, does not only eliminate noise. It also helps reducing mismatch between pixel circuits. To illustrate this, FIG. 9 shows, in an idealized and simplified way, the response of a photoreceptor signal $V_{pr}$ to an illumination step and the corresponding change detections by a change detector 12. Illumination of the photoreceptor 10 starts at time to. A step of light is similar to what happens when an edge is moving along a series of pixels. The response of the photoreceptor signal $V_{pr}$ can be approximated by an exponential curve 40, asymptotically converging to an end value. A detection signal 42 is sent each time the photoreceptor signal $V_{pr}$ increases by a voltage threshold. At first, the photoreceptor signal $V_{pr}$ increases rapidly, due to the exponential nature of the response. The firsts detection signals 42a are therefore close to one another in time, and constitute a burst of events. The increase rate of the photoreceptor signal $V_{pr}$ becomes slower with time. As a result, the subsequent detection signals 42b become more and more separated in time. It is clear that the event time $t_i$ associated with each detection signal 42 is closely related to the shape of the curve 40 defined by the time constant of the exponential response of the photodetector 10.

If there is some mismatch between different pixel circuits 1, the time constant of their respective exponential response will be different. As a result, the timings of the events generated by two pixel circuits 1 under the same illumination will differ. This will introduce what is called jitter in the resulting events since events produced on different pixel circuits 1 seeing the same stimulus will have slightly different event times. Moreover, there is no guarantee that the initial reference point of the response is the same for two pixel circuits 1, which will also introduce some more jitter in the events produced by two pixel circuits 1. Due to the exponential nature of the response, little differences result in huge time differences for later events 42b, and much smaller time differences for earlier events 42a. By rejecting the later events 42b in a burst of events, the filtering thus reduces the jitter. The uncertainty regarding the detected contrast is thus reduced.

The rejection of the later events 58c is dictated by the time threshold used in condition b), and therefore the choice of a suitable time threshold depends on the features of the photoreceptor 10, i.e. the time-constant, and on the voltage threshold for change detection (the lower the voltage threshold, the smaller the time threshold since events will be closer in time).

FIG. 9 shows the idealized response of a photoreceptor signal $V_{pr}$ to an illumination step, i.e. to the sharpest contrast occurring at once. In reality, edges of a scene present various contrasts, and the speed of the contrast variations seen by a pixel are dictated by how fast the edge is moving in the scene. The event filtering method restrict events acceptation to edges contrasted enough and moving quickly enough to cause a burst of events. The event filtering method can thus be seen as forming a high-pass filter for the edges.

In the examples above, the first condition a) (the received event has a same polarity as the polarity of an immediately preceding last received event) implies that the first event of a burst of events is rejected, while the subsequent events are accepted. Accepting the second event (and the subsequent events), means that changes translated into at least two events will be kept by the filtering. It may however be desirable to make the filtering more discriminating, by requiring that only changes translated into at least three or more events will be kept. This can be done by modifying the first condition into a modified first condition a') according to which an event must have the same polarity as the polarity of the last two events. More generally, for selecting only changes strong enough to be translated into at least M events (M>1), the modified first condition a') can be expressed as requiring that an event must have the same polarity as the polarity of the last (M−1) received events.

To do so, the event filter 20 can be associated with M−1 polarity memory elements 24 whose state depends on the polarity of the last (M−1) received events. For example, with M=3, the state of a first polarity memory element 24 depends on the polarity of the last received event and the state of a second polarity memory element 24 depends on the polarity of the penultimately received event (the event received just before the last received event). To be accepted, the event must have the same polarity as the last received event and the penultimate received event, which implies that the last received event and the penultimate received event must share the same polarity.

With the modified first condition a') and the second condition b) only, a received event with the same polarity as the polarity of the last M−1 received events (modified first condition a')) and a time interval with respect to last received event is inferior to a time threshold (condition b)), would be accepted, even if a time interval between two successive event among the last M−1 received events is superior to the time threshold. For example, the time interval between the M−2$^{th}$ last received event and the M−1$^{th}$ last received event could be larger than the time threshold. This means that the modified first condition a') alone only rejects polarity changes regardless of their timings.

In order to better filter the events, it may be desirable to restrict acceptation to events which are part of a trail of events of the same polarity, i.e. to a series of events successively separated by time intervals each below the time threshold. Indeed, only such a trail of events reflects strong contrast edges moving in the scene. Accordingly, for M≥2 (and preferably M>2), an additional second condition b') can be imposed to restrict the modified first condition a') to an actual trail of M events. The additional second condition b') can be expressed as requiring that each time intervals between the successive event times of the last M−1 received events must be inferior to the time threshold.

The additional second condition b') can be implemented for example with a counter 29. The counter 29 is incremented each time an event is received, and is reset with the timer signal sent by the timer 26. Additional second condition b') then corresponds to accepting the received event only if the counter is at least at M−1. If polarity changes in the trail of events, the received event does not have the same polarity as the polarity the M−1 last received events (modified first condition a') is not met), and therefore the received event is rejected (regardless of the timing of the received events). If polarity does not change in the trail of events (modified first condition a') is met), the counter 29 must be at least at M−1 for the event to be accepted (additional second condition b'). Using together the modified first condition a'), the second condition b) and the additional second condition b') ensure that only the M$^{th}$ and subsequent events of a trail of events are accepted.

In addition to being reset with the timer signal sent by the timer 26, the counter 29 may also be reset each time a polarity change is detected in the trail of events, i.e. each time the received event has not a same polarity as the polarity of the last received event (condition a) not met). In this case, there is no need for several polarity memory elements 24. The counter 29 then counts only the number of received events of the same polarity which are successively separated by time intervals each shorter than the time threshold. As before, the counter 29 must be at least at M−1 for the event to be accepted. The counter 29 thus implements the modified first condition a') and the additional second condition b').

In any case, in the examples above, a burst of events is rendered by a trail of events after filtering, except for the first M−1 events and isolated later events. This could still amount to a significant number of events to be treated in a short time (in a burst), imposing both processing and bandwidth requirements. The number of events in a trail can be used for assessing the amplitude of the change in the photoceptor signal $V_{pr}$. However, in a lot of computer vision algorithms, the relevant information is only that an edge is passing before a pixel, and the actual contrast of that edge is not used. It can therefore be desirable to further reduce the number of events to keep only one event for each burst instead of a trail of events.

In a preferred embodiment, the event filter 20 only accepts the received event if a third condition is met: c) the received event is part of a trail of events in which no previously received event was accepted, a trail of events consisting in a series of successive events of same polarity each separated by time intervals shorter than the time threshold. This allows to keep only one event per edge and can drastically reduce the number of events generated by a scene. Considering that the quality of edge acquisition increases if the voltage detection threshold are lowered (small contrast edges will be detected, latency to edge detection will be smaller), this embodiment allows to lower the voltage threshold without increasing the amount of events generated (since a lower threshold means generating more events for an edge of a given contrast).

To implement this third condition c), the event filter can be associated with a trail memory element 28 whose state $M_{hs}$ indicates whether a received event has been accepted since the last reset, the trail memory element 28 being reset each time the received event has a polarity different from the polarity of the last received event and/or is reset with the timer signal, i.e. each time the received event and the last received event are separated by a time interval longer than the time threshold. More specifically, the trail memory element 28 is in a first state following its reset, and changes to a second state when a received event is accepted. As a non-limitative example, in the rest of the description, the state $M_{hs}$ is 1 if an event has been accepted and transmitted in the ongoing train of ON or OFF events, and 0 otherwise. The trail memory element 28 may be a latch such as a simple set-reset latch, since only one bit of information is to be stored, i.e. either 1 or 0. As illustrated in FIG. 4, the trail memory element 28 is preferably part of the event filter 20.

As indicated above, several options are possible to reset the trail memory element 28. The trail memory element 28 can be reset only each time the received event has a polarity different from the polarity of the last received event. A change of polarity indeed indicates that the trail has ended. A trail may also end because the events are no longer temporally close to each other (with time interval longer than the time threshold), without any polarity change. With this sole resetting condition, events of second trail of events of the same polarity as a first trail of events will be rejected. This effect can be sought. Preferably however, the trail memory element 28 can be reset each time the received event has a polarity different from the polarity of the last received event and each time the received event and the last received event are separated by a time interval longer than a time threshold. In this way, each trail of events will be translated into an accepted event, even without polarity change between consecutive trails of events. The time threshold can be the same time threshold as the one for accepting or not a received event. In this case, the trail memory element 28 can be reset by the timer signal already mentioned. It is also possible to use an additional, different time threshold. An additional timer can be provided for generating an additional timer signal when the additional time threshold is reached.

It is also possible to implement condition c) with the counter 29 discussed above, which counts only the number of received events of the same polarity which are successively separated by time intervals each shorter than the time threshold. The counter 29 is incremented each time an event is received, and is reset with the timer signal sent by the timer 26 and each time a polarity change is detected. The received event is accepted only if the counter 29 is at M−1 (M≥2). Thus, only the M−1$^{th}$ received event is accepted among a trail of events of the same polarity which are successively separated by time intervals each shorter than the time threshold. M can be any number greater than 2, and is chosen by the skilled person to achieve the desired event filtering.

Figure 10:
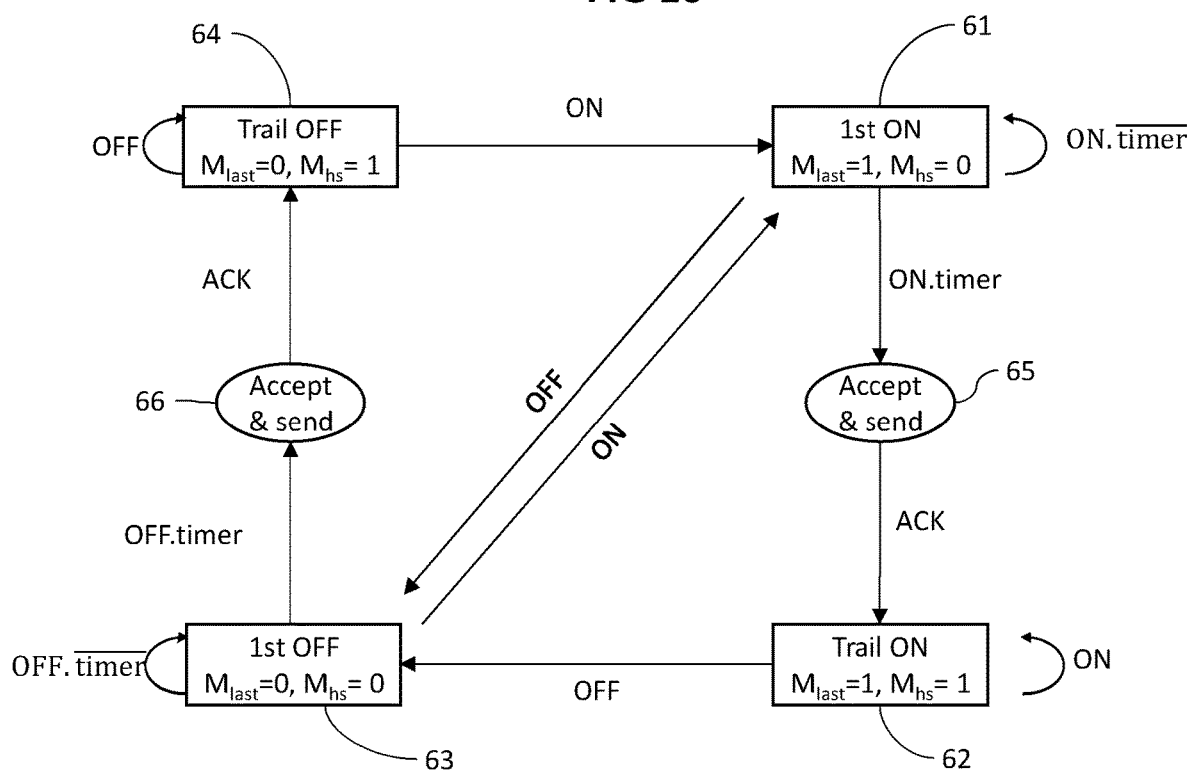
FIG. 10 is a state transition diagram representing the states of the event filter during filtering in accordance to a possible embodiment of the invention.

FIG. 10 shows a state transition diagram representing the implementation of the first condition a), the second condition b) and the third condition c). A rectangle indicates a resting state 61, 62, 63, 64, and an oval indicates a transitory state 65, 66 leading to a resting state. The event filter 20 stays in a resting state 61, 62, 63, 64 while no event is received. In the rectangles, two numbers indicate the logical state of the memory elements 24, 28. The left number corresponds to the state $M_{last}$ of the polarity memory element 24, and the right number corresponds to the state $M_{hs}$ of the polarity memory element 28. More precisely, the left number is 0 if the last received event was an OFF event, and is 1 if the last received event was an ON event. The right number is 1 if an event has already been accepted in a trail of ON or OFF events, and is 0 otherwise. The timer signal is 1 if the timer has not yet reached the time threshold, and is 0 if the timer has reached the time threshold. The numbers mentioned here correspond to logical states, and other conventions could of course be chosen.

An (arbitrary chosen) first resting state 61 is defined by $M_{last}$=1 and $M_{hs}$=0 and corresponds to a first ON event having been received. The event filter 20 stays in this first resting state 61 if an ON event is received while the timer signal is 0 (meaning that the time interval since the last received event is above the time threshold), because it means that the last two received ON events are not part of the same trail. If an ON event is received and the timer signal is 1, it means that the ON event has been received within a time interval shorter than the time threshold since the last received ON event. The received ON event is therefore the second event of a trail of ON events, and the previously received event was the first event of the same trail of ON events. The received ON event is accepted and sent (transitory state 65), and the event filter 20 transitions to a second resting state 62. If the event filter 20 is part of the pixel circuit 1, the transition to the second resting state 62 may be conditioned to the reception, by the interface logic 14, of acknowledgement signal ACK. If an OFF event is received while the event filter 20 is in the first resting state 61, the event filter 20 transitions to a third resting state 63. The second resting state 62 is defined by $M_{last}$=1 and $M_{hs}$=1, and indicates that an ON event has been sent in a trail of ON events. The event filter 20 therefore stays in the second resting state 62 if ON events are received. If an OFF event is received, the event filter 20 transitions to the third resting state 63.

The third resting state 63 is defined by $M_{last}=0$ and $M_{hs}=0$, and indicates that a first OFF event has been received. The event filter 20 stays in this third resting state 63 if an OFF event is received while the timer signal is 0 (meaning that the time interval since the last received event is above the time threshold), because it means that the last two received OFF events are not part of the same trail. If an OFF event is received and the timer signal is 1, it means that the OFF event has been received within a time interval shorter than the time threshold since the previously received OFF event. The received OFF event is therefore the second event of a trail of OFF events, and the previously received event was the first event of the same trail of OFF events. The received OFF event is accepted and sent (transitory state 66), and the event filter 20 transitions to a fourth resting state 64. If the event filter 20 is part of the pixel circuit 1, the transition to the fourth resting state 64 may be conditioned to the reception, by the interface logic 14, of acknowledgement signals ACK. If an ON event is received, the event filter transitions to the first resting state 61. The fourth resting state 64 is defined by $M_{last}=0$ and $M_{hs}=1$, and indicates that an OFF event has been sent in a trail of OFF events. The event filter 20 therefore stays in the fourth resting state 64 if OFF events are received. If an ON event is received, the event filter 20 transitions to the first resting state 61.

Accordingly, the logic to accept an event is $$\text{timer} \cdot \overline{M_{hs}} \cdot (\text{OFF} \cdot \overline{M_{last}} + \text{ON} \cdot M_{last})$$

and the logic to reject an event is $$\text{ON} \cdot (M_{hs} + \overline{M_{last}} + \overline{\text{timer}}) + \text{OFF} \cdot (M_{hs} + M_{last} + \text{timer})$$

It shall be noted that the polarity of an event being either ON or OFF, OFF could also be noted $\overline{\text{ON}}$.

Figure 11:
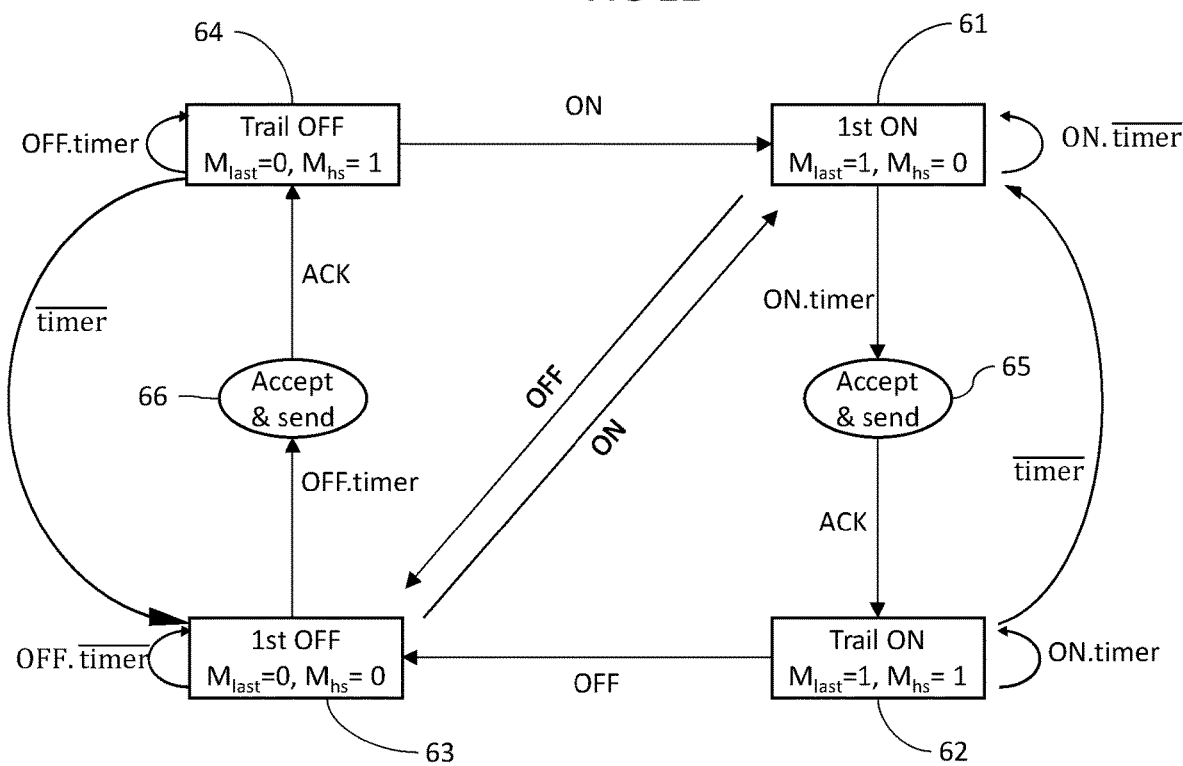
FIG. 11 is a state transition diagram representing the states of the event filter during filtering in accordance to a possible embodiment of the invention.

In the example of FIG. 10, the trail memory element 28 is reset ($M_{hs}$ set to 0) only when a polarity change occurs. This is clearly shown by the fact the event filter 20 stays in the second resting state 62 and in the fourth resting state 64 as long as events of the same polarity are received, regardless of the time intervals between them. FIG. 11 shows a similar state transition diagram representing the implementation of the first condition a), the second condition b) and the third condition c), when the trail memory element 28 is reset each time the received event has a polarity different from the polarity of the last received event and each time the received event and the last received event are separated by a time interval longer than the time threshold. The event filter 20 now stays in the second resting state 62 only if ON events are received within a time interval shorter than the time threshold. If the timer signal indicates that the time threshold has elapsed, the event filter 20 transitions back to the first resting state 61. It indeed means that the trail of ON events ended since no event has been received during an interval corresponding to the time threshold. Similarly, the event filter 20 now stays in the fourth resting state 64 only if OFF events are received within a time interval shorter than the time threshold. If the timer signal indicates that the time threshold has elapsed, the event filter 20 transitions back to the third resting state 63. It indeed means that the trail of OFF events ended since no event has been received during an interval corresponding to the time threshold. The logic to accept or reject an event is not modified.

Figure 12:
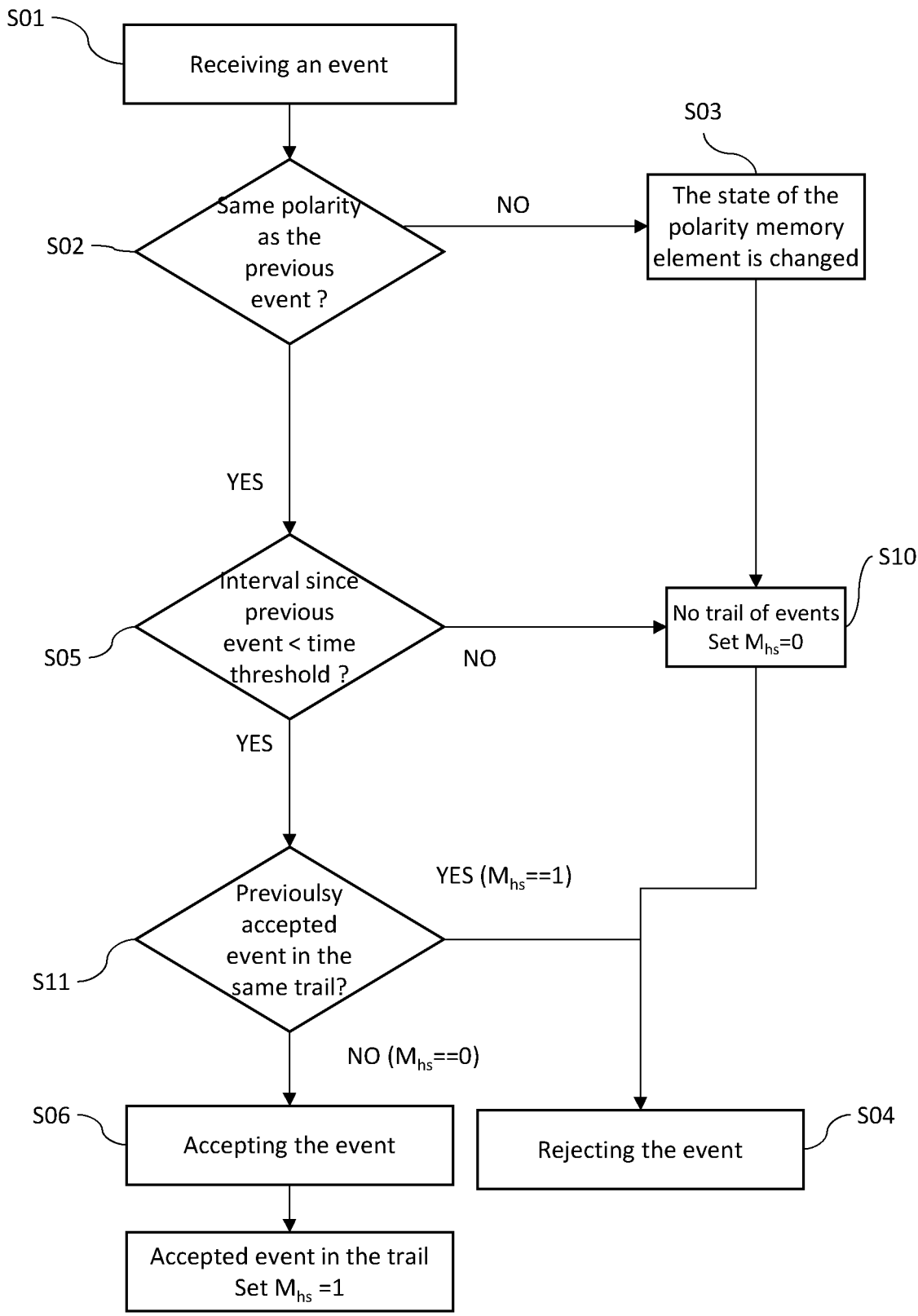
FIG. 12 is a flow chart steps of event filtering performed by an event filter in accordance to a possible embodiment of the invention.

FIG. 12 is a flowchart showing steps of event filtering performed by an event filter 20 when implementing the first condition a), the second condition b) and the third condition c). As in the flowchart of FIG. 7, in a first step S01, an event is received by the event filter 20. In a second step S02, the polarity of the received event is checked to verify whether the received event has a same polarity as the polarity of an immediately preceding previous received event. If not, the event is rejected (step S04). To compare the polarities, the event filter 20 may use the state stored in the polarity memory element 24. The step S02 thus comes down to comparing the polarity of the received event with the state stored in the polarity memory element 24. The state of the polarity memory element 24 is changed (Step S03) at least each time it is determined that the received event has a different polarity than the polarity of the last received event. If the received event has the same polarity as the polarity of an immediately preceding last received event, the event filter 20 verifies whether the time interval between the event time of the received event and the event time of the immediately preceding last received event is inferior to the preset time threshold (step S05).

In addition to the rejection of the event, if it is determined that the received event has a polarity different from the polarity of the previous event, or if it determined that the time interval between the received event and the last received event is superior to the time threshold, the state $M_{hs}$ of the trail memory element 28 is changed (Step S10) to reflect the fact that the received event is not part of the same trail as the last event (it is recalled that a trail of events consists in a series of successive events of same polarity successively separated by time intervals shorter than the time threshold). In accordance with the non-limiting examples above, the state $M_{hs}$ of the trail memory element 28 is set to 0. It shall be noted that although FIG. 12 shows that the state $M_{hs}$ of the trail memory element 28 is changed (S10) after the state of the polarity memory element 24 is changed (S03), the changing of the state $M_{hs}$ of the trail memory element 28 is directly caused by the received event having a different polarity the polarity of an immediately preceding previous received event, and is not necessarily caused by the change of the polarity memory element. The two changes (S03, S10) of the memory elements 24, 28 can be done independently.

If the time interval between the received event and the last received event is inferior to the time threshold (step S05), it means that the received event is part of the same trail as the last received event. The state $M_{hs}$ of the trail memory element 28 is then tested to determine whether a previous event has already been accepted in the same trail of events (step S11). In accordance with the non-limiting examples above, if the state $M_{hs}$ of the trail memory element 28 is 1, it means that a previous event has been accepted in the same trail, and the received event is rejected (step S04). If the state $M_{hs}$ of the trail memory element 28 is 0, it means that a previous event has not yet been accepted in the same trail, and the received event is accepted (step S06). After an event is accepted, the state $M_{hs}$ of the trail memory element 28 is changed to reflect that an event has been accepted in the trail of events. In accordance with the non-limiting examples above, the state $M_{hs}$ of the trail memory element 28 is set to 1.

Back to FIG. 8, a fourth graph 70 shows how the third condition c) modifies the filtering of the events when compared to the third graph 56. Fewer events are accepted. Only 5 events are accepted out of 29 received events, compared to 13 accepted events in the third graph 56. Only one event is accepted in a trail of events of the same polarity. As a result, each burst of events is represented by a single event 58*b*, 59*b*. In the depicted example, only the second event of a burst of events is accepted. More generally, it is possible to accept only the $M^{th}$ event of each burst. Information relating to the presences of the edges is kept, but information relating to the contrast is lost: every edge causing a burst of events is represented by a single accepted event. This could be interpreted as a normalization. The event filer 20 thus normalizes the responses of the pixel circuits to edges of different contrast by generating only a single event for each edge.

The proposed event filtering method constitutes a significant improvement for operating an event-based image sensor, even with respect to other event filtering methods. For example, the fifth graph 80 of FIG. 8 shows the events that are accepted in accordance with the filtering disclosed in the article "*Inceptive Event Time-Surfaces for Object Classification using Neuromorphic Cameras*", by R. Baldwin et al., when applied to events of the second graph 53 of the same figure. It is recalled that the filtering consists in keeping an event only if:

1) the time interval between an event $t_i$ and the previous event $t_{i-1}$ is larger than a first time threshold $\tau^-$, and 2) the time interval between the next event $t_{i+1}$ and the current event $t_i$ is smaller than a second time threshold $\tau^+$.

This filtering selects the events based on the time intervals between a received event and the last and next events. As explained before, noise events 57*a* may have short intervals between them, and thus a first noise event 57*a* is accepted if the following noise event is close in time. As a result, some of the alternating noise events 57*a* are filtered, but not all of them. This is because this filtering is done regardless of the polarities of the events. Noise events being characterized by alternating polarities, the proposed filtering method allows a much better filtering of the noise events. In the filtering of R. Baldwin et al., a burst of events 58, 59 is rendered by the first event 58*a*, 59*a* of the burst, each subsequent event of a burst is too close to the previous event (condition 1 no met) even it is close to the next event (condition 2 met). However, there are some problems. For example, in a first part 81 of the graph 80, a ON noise event 57*a* is accepted, and the following events, part of a burst of OFF events 59 corresponding to a decrease in the photoreceptor signal $V_{pr}$ are rejected because the successive time intervals between events are shorter than the first time threshold (condition 1 not met). The events of a burst of OFF events are therefore rejected and instead seem to be rendered by an ON event. In a second part 82 of the graph 80, a burst of OFF events 59 that closely follows a burst of ON event is not rendered, because the successive time intervals between the events of the burst of OFF events and of the ON events are shorter than the first time threshold. The filtering of R. Baldwin et al. may produce erroneous results for certain timings of bursts of events, and does not eliminate the noise. This is particularly critical than the number of events is reduced, thus emphasizing the significance of each event.

This short example shows that the proposed event filtering allows a better noise filtering, and a faithful rendering of each burst of events, regardless of their timings.

In an example application it may be advantageous to illuminate the scene with a carefully chosen spatial and temporal light pattern. The described filter can be used to produce one filtered event, only when the complete light pattern is observed. Any other pattern produces no events. Thus the event filter 20 can ignore all raw events that originate from noise or any other light pattern. This allows the reliable detection of the pattern corresponding to the filter logic and the filtering of noise and events which do not comprise the pattern. Such patterns can be used in active triangulation systems that determine the distance of objects from the system or a depth map of a scene.

Figure 13:
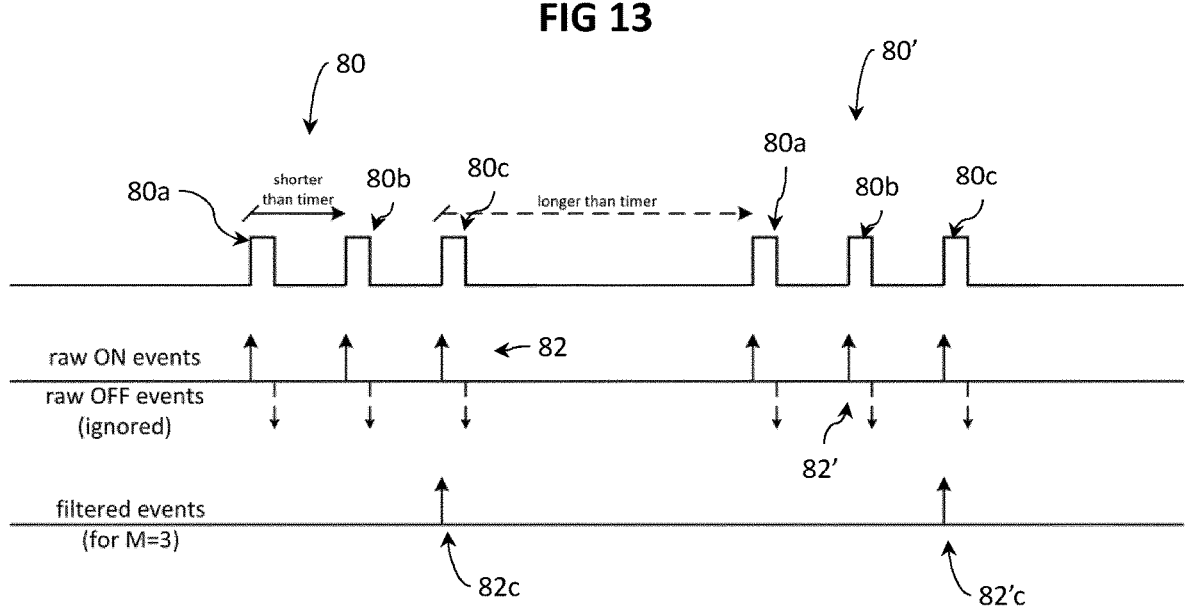
FIG. 13 shows graphs illustrating an event filtering applied to an example of specific pattern in the photoreceptor signal.

The example implementation of FIG. 13, shows an idealized light pattern, as observed by one pixel circuit. The light stimulus comprises a train 80 of pulses 80*a*, 80*b*, 80*c* (three pulses in this example), followed by another train 80' of pulses 80*a*, 80*b*, 80*c*. The pulses 80*a*, 80*b*, 80*c* of a train 80 of pulse are separated from each other by a time interval shorter than a time threshold, for example defined by a timer. Two pulse trains 80, 80' are separated from each other by a time interval longer than the time threshold, for example defined by a timer. The pulsing light stimulus might be spatially arranged as a narrow strip. The location of the strip can be different for each train of pulses, so that its projection onto the image provides information about the scene being imaged.

The pixel circuit 1 can be configured to emit an event only if the detected change is in a specific direction (i.e. increase or decrease), and to emit no event if the detected change is in the other direction. In this example, the pixel circuit 1 is configured to produce one raw ON event for each rising edge (increase in illumination) and no OFF events for each falling edge (decrease in illumination) of the pulsing light pattern of the light impinging on a light-sensitive element of the photoreceptor 10. The pixel circuit 1 is configured to ignore the events due to falling edges, i.e. to not send any OFF events to the event processing chain, and in particular to the input of the event filter 20. In another example, all the raw events (both ON and OFF) could be generated by the pixel circuit 1, and the event filter 20 can be configured to reject all the events of a particular polarity, for example all the OFF events.

The event filter 20 is configured to accept the received event only if a') the received event has a same polarity as the polarity of the last M−1 received events, M being the number of pulses in the pattern, and if b') the received event and the last M−1 received events are successively separated by time intervals each shorter than the time threshold, said time threshold corresponding to a duration between the interval between pulses and the interval between pulse trains. It should be noted that if the pixel circuit only emits events of a same polarity, as in the illustrated example, condition a') is always fulfilled. With respect to the state diagrams of FIGS. 10 and 11 can be simplified by not taking into account the state $M_{last}$ that depends on the polarity of the last received event.

In the example, M=3, so the event filter 20 is configured to accept the received event only if a') the received event has a same polarity as the polarity of the last 2 received events, and b') the last three received events are successively separated by time intervals each shorter than the time threshold defined by the timer. Since the time between two raw events in the pattern is less than the timer interval, the counter will not reset during the pattern (i.e. the pulse train). There is a duration longer than the timer interval before the next pulse begins, to allow the counter to reset. In this example, the event filter 20 receives trails 82, 82' of three ON events corresponding to the rising edges of the pulses 80*a*, 80*b*, 80*c* of the pulse train 80, 80', res. Accordingly, the event filter 20 outputs only the third ON event of each train of ON events, corresponding to the third rising edge of the pulse train 80, 80'. An event is therefore produced only when the specific light pattern is observed (three pulses in this example). While the present invention has been described with respect to certain preferred embodiments, it is obvious that it is in no way limited thereto and it comprises all the technical equivalents of the means described and their combinations. In particular, it will be apparent to those skilled in the art that various changes and modifications may be made without departing from the scope of the invention as defined in the appended claims.

The invention claimed is:

1. An event-based image sensor comprising a plurality of pixel circuits forming a pixel array, each pixel circuit comprising a photoreceptor circuit configured to generate a photoreceptor signal derived from a photocurrent generated by a light impinging on a light-sensitive element of the photoreceptor circuit, and a detector configured to detect a change in the photoreceptor signal and to generate an event in response to the detected change in the photoreceptor signal, the event including a signal indicating a polarity associated with a direction of the change, the event-based image sensor further comprising:
- a processing chain comprising at least one pixel circuit of the plurality of pixel circuits, an arbiter, a sensor driving circuit, and a host, wherein the generated event is sent to at least one of the arbiter, to the sensor driving circuit, and to the host; and
- an event filter configured to receive the generated event, and to accept the received event based on a plurality of conditions, the plurality of conditions including that the received event is part of a previously unaccepted event trail, the event trail comprising a plurality of successive events having a same polarity and separated by time intervals each shorter than a time threshold.

2. The event-based image sensor of claim 1, wherein the event filter comprises a timer configured to reset in response to an event being received and to output a timer signal after a duration corresponding to the time threshold.

3. The event-based image sensor of claim 2, wherein the event filter further comprises a counter configured to increment in response to an event being received and to reset with the timer signal.

4. The event-based image sensor of claim 3, wherein the counter is further configured to reset when a polarity of the received event is different from a polarity of a preceding event received by the event filter.

5. The event-based image sensor of claim 4, wherein the event filter is associated with at least one polarity memory element, and wherein a state of the polarity memory element depends on a polarity of the preceding event.

6. The event-based image sensor of claim 4, wherein the event filter is associated with a trail memory element, and wherein a state of the trail memory element indicates whether the received event has been accepted since the last reset of the timer.

7. The event-based image sensor of claim 6, wherein the trail memory element is configured to:
- reset in a first state when the polarity of the received event is different from the polarity of the preceding event; and
- set in a second state when the received event is accepted.

8. The event-based image sensor of claim 7, wherein the trail memory element is further configured to reset in the first state when the received event and the preceding event are separated by a time interval longer than the time threshold.

9. The event-based image sensor of claim 4, wherein the received event is accepted if the counter is at M−1, wherein M≥2.

10. The event-based image sensor of claim 1, wherein the event filter is arranged within a component of a plurality of components of the processing chain, the plurality of components comprising one or more of the at least one pixel circuit, the arbiter, the sensor driving circuit, and the host.

11. The event-based image sensor of claim 1, wherein the event filter is arranged between two components of a plurality of components of the processing chain, the plurality of components comprising one or more of the at least one pixel circuit, the arbiter, the sensor driving circuit, and the host.

12. The event-based image sensor of claim 1, wherein the plurality of conditions to accept the received event further includes a first condition and a second condition, wherein:
- the first condition is that a polarity of the received event is same as a polarity of a preceding event; and
- the second condition is that a time interval between the received event and the preceding event is shorter than the time threshold.

13. The event-based image sensor of claim 1, wherein the plurality of conditions to accept the received event further includes a first condition that a polarity of the received event is same as a polarity of each of a plurality of M−1 preceding events, wherein M>2.

14. The event-based image sensor of claim 13, wherein the plurality of conditions to accept the received event further includes a second condition that a time interval between the received event and each of the plurality of M−1 preceding events is shorter than the time threshold.

15. An event filtering method for use with an event-based image sensor, the method comprising:
- generating, using a photoreceptor circuit, a photoreceptor signal derived from a photocurrent generated by a light impinging on a light-sensitive element of the photoreceptor circuit;
- generating an event in response to a change in the photoreceptor signal detected by a detector, the generated event including a signal indicating a polarity associated with a direction of the change;
- transmitting the generated event to a processing chain including an arbiter, a sensor driving circuit, and a host; and
- receiving the generated event and accepting the received event based on a plurality of conditions, the plurality of conditions including that the received event is part of a previously unaccepted event trail, the event trail comprising a plurality of successive events having a same polarity and separated by time intervals each shorter than a time threshold.

16. The event filtering method of claim 15, wherein the plurality of conditions to accept the received event further includes a first condition and a second condition, wherein:
- the first condition is that a polarity of the received event is same as a polarity of a preceding event; and
- the second condition is that a time interval between the received event and the preceding event is shorter than the time threshold.

17. The event filtering method of claim 15, wherein the plurality of conditions to accept the received event further includes a first condition that a polarity of the received event is same as a polarity of each of a plurality of M−1 preceding events, wherein M>2.

18. The event filtering method of claim 17, wherein the plurality of conditions to accept the received event further includes a second condition, after the first condition is met, that a time interval between the received event and each of the plurality of M−1 preceding events is shorter than the time threshold.

19. The event filtering method of claim 15, wherein the method further comprises resetting a timer in response to an event being received and outputting a timer signal after a duration corresponding to the time threshold.

20. The event filtering method of claim 19, wherein the method further comprises incrementing a counter in response to an event being received and resetting the counter with the timer signal.

21. The event filtering method of claim 20, wherein the method further comprises resetting the counter when a polarity of the received event is different from a polarity of a preceding received event.

* * * * *